US008837944B2

(12) United States Patent
Sarashina et al.

(10) Patent No.: US 8,837,944 B2
(45) Date of Patent: Sep. 16, 2014

(54) POWER SUPPLY CONTROL METHOD, AN OPTICAL NETWORK UNIT, AN OPTICAL LINE TERMINAL AND A COMMUNICATION SYSTEM

(75) Inventors: Masahiro Sarashina, Saitama (JP); Satoshi Furusawa, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 122 days.

(21) Appl. No.: 13/431,969

(22) Filed: Mar. 27, 2012

(65) Prior Publication Data

US 2012/0251115 A1    Oct. 4, 2012

(30) Foreign Application Priority Data

Apr. 4, 2011    (JP) ................. 2011-082840

(51) Int. Cl.
*H04J 14/00*    (2006.01)
*H04B 10/00*    (2013.01)
*H04J 14/02*    (2006.01)
*H04Q 11/00*    (2006.01)

(52) U.S. Cl.
CPC ... *H04Q 11/0067* (2013.01); *H04Q 2011/0079* (2013.01); *H04J 14/0246* (2013.01); *H04J 14/0254* (2013.01); *H04J 14/0282* (2013.01); *H04J 14/0267* (2013.01); *H04J 14/025* (2013.01)
USPC ........................................... 398/67; 398/140

(58) Field of Classification Search
USPC ............ 398/67, 70, 72, 153, 165, 167.5, 140; 455/419
See application file for complete search history.

(56) References Cited

U.S. PATENT DOCUMENTS

| 2005/0097543 | A1* | 5/2005 | Hirayama | 717/168 |
|---|---|---|---|---|
| 2011/0211837 | A1* | 9/2011 | Sugawa et al. | 398/67 |
| 2012/0288279 | A1* | 11/2012 | Zhang et al. | 398/66 |
| 2013/0236170 | A1* | 9/2013 | Nishitani et al. | 398/25 |

FOREIGN PATENT DOCUMENTS

| CN | 101729948 A | * | 6/2010 | ............. H04Q 11/00 |
|---|---|---|---|---|
| JP | 2007-089027 A | | 4/2007 | |
| JP | 2008-113193 A | | 5/2008 | |
| JP | 2008-263294 A | | 10/2008 | |

* cited by examiner

*Primary Examiner* — David Payne
*Assistant Examiner* — Casey Kretzer
(74) *Attorney, Agent, or Firm* — Rabin & Berdo, P.C.

(57) ABSTRACT

In an optical communication system that communicates between an optical line terminal (OLT) and a plurality of optical network units (ONU), an ONU can decide an operation time period of communicating with the OLT and an idle time period of reduced or suspended communication with the OLT by using a timer. The OLT can decide a software renewal time period based on the operation time period and the idle time period. Accordingly, the ONU can supply electrical power to its own communication circuit during the operation time period or the software renewal time period, or cut off or reduce the electrical power if a present time does not occur in either the operation time period or the software renewal time period.

11 Claims, 9 Drawing Sheets

FIG. 8

| ONU NO. | OPERATING TIME-1 | OPERATING TIME-2 | OPERATING TIME-3 | · · · |
|---|---|---|---|---|
| ONU-1 | 07:00 – 11:00 | 15:00 – 18:00 | 20:00 – 23:00 | |
| ONU-2 | 08:00 – 15:00 | 18:00 – 20:00 | | |
| ONU-3 | 12:00 – 24:00 | | | |
| ⋮ | | | | |

POWER SUPPLY CONTROL METHOD, AN OPTICAL NETWORK UNIT, AN OPTICAL LINE TERMINAL AND A COMMUNICATION SYSTEM

CROSS-REFERENCE TO RELATED APPLICATION

This application claims priority under 35 U.S.C. §119 from Japanese Patent Application No. 2011-082840, filed on Apr. 4, 2011, the entirety of which is incorporated herein by reference.

BACKGROUND

1. Technical Field

This specification relates to an optical communication network system using optical fiber cables for connection between an optical line terminal (OLT) and an optical network unit (ONU). This specification relates more particularly an optical communication network system that can reduce power consumption of the ONU.

2. Description of the Related Art

Optical communication systems can include, for example, an optical line terminal (OLT) and a plurality of optical network units (ONUs). In some implementations, such optical communication systems can employ an optical access system which utilizes a Gigabit Ethernet-Passive Optical Network (GE-PON) system. Other implementations are possible. In optical communication systems, as in many other kinds of systems, there is an interest in reducing power consumption.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

This specification relates to a power supply control method that can reduce power consumption of an ONU and an OLT, and to a communication system that can utilize the power supply control method effectively. The power supply control method can comprise determining, by an Optical Network Unit (ONU), an operation time period corresponding to a communication mode that supplies electrical power to a communication circuit, and an idle time period corresponding to a sleep mode that cuts off or reduces the electrical power to the communication circuit. The power supply control method can further comprise transmitting, from the ONU to an Optical Line Terminal (OLT), an operation time information signal that indicates the operation time period and the idle time period, and receiving, by the OLT, the operation time information signal.

The power supply control method can further comprise determining, by the OLT, a software renewal time period based on the operation time information signal, transmitting from the OLT to the ONU a software renewal time information signal that indicates the software renewal time period, and receiving, by the ONU, the software renewal time information signal.

The power supply control method can further comprise, by the ONU, based on determining that a present time is in (e.g., occurs in) the operation time period or the software renewal time period, supplying the electrical power to the communication circuit during the operation time period or the software renewal time period, or based on determining that the present time is not in the operation time period or the software renewal time period, cutting off or reducing the electrical power to the communication circuit.

An ONU that communicates with an OLT can comprise a timer unit that determines an operation time period corresponding to a communication mode that supplies electrical power to a communication circuit, and determines an idle time period corresponding to a sleep mode that cuts off or reduces the electrical power to the communication circuit. The ONU can further comprise a transmitting unit that transmits, to the OLT, an operation time information signal that indicates the operation time period and the idle time period, a receiving unit that receives a software renewal time information signal transmitted from the OLT, the software renewal time information signal indicating a software renewal time period, and a power supply control unit that, based on a present time occurring in the operation time period or the software renewal time period, supplies electrical power to the communication circuit during the operation time period or the software renewal time period, or based on the present time not occurring in the operation time period or the software renewal time period, cuts off or reduces the electrical power to the communication circuit.

In addition, the OLT that communicates with a plurality of ONUs can comprise a receiving unit that receives, from the ONUs, an operation time information signal indicating an operation time period and an idle time period which are determined by each of the ONUs, a software renewal time decision unit that determines a software update time period based on the operation time information signal, and a transmitting unit that transmits, to the ONUs, a software renewal time information signal that indicates the software update time period.

Furthermore, a communication system that communicates between an OLT and an ONU can comprise a timer unit that determines an operating time period corresponding to a communication mode in which the ONU communicates with the OLT, and an idle time period corresponding to a sleep mode in which the ONU suspends or reduces communication with, or does not communicate with, the OLT.

The system can further comprise a transmitting unit that transmits, to the OLT, an operation time information signal indicating the operating time period and the idle time period, a receiving unit that receives, from the OLT, a software renewal time information signal that indicates a software renewal time period, and a power supply control unit that, based on a present time occurring in the operation time period or the software update time period, supplies electrical power to the communication circuit during the operation time period or the software renewal time period, or based on the present time not occurring in the operation time period or the software renewal time period, cuts off or reduces the electrical power to the communication circuit.

The OLT can comprise a receiving unit that receives the operation time information signal, a software update time period decision unit that determines the software renewal time period based on the operation time information signal transmitted from the ONU, and a transmitting unit that transmits, to the ONU, a software renewal time information signal that indicates the software renewal time period.

BRIEF DESCRIPTION OF THE DRAWINGS

FIG. 8 illustrates an example of a management table associated with the optical communication network system.

DETAILED DESCRIPTION

An optical communication network system, an optical line terminal (OLT), and an optical network unit (ONU) according to various non-limiting embodiments will be explained in detail below with reference to the accompanying drawings. In the following description, for purposes of explanation, numerous specific details are set forth in order to provide a thorough understanding of the embodiments. It may be evident, however, that the embodiments can be practiced without these specific details. In other instances, well-known structures and devices are shown in Nock diagram form in order to facilitate describing the embodiments.

Figure 1:
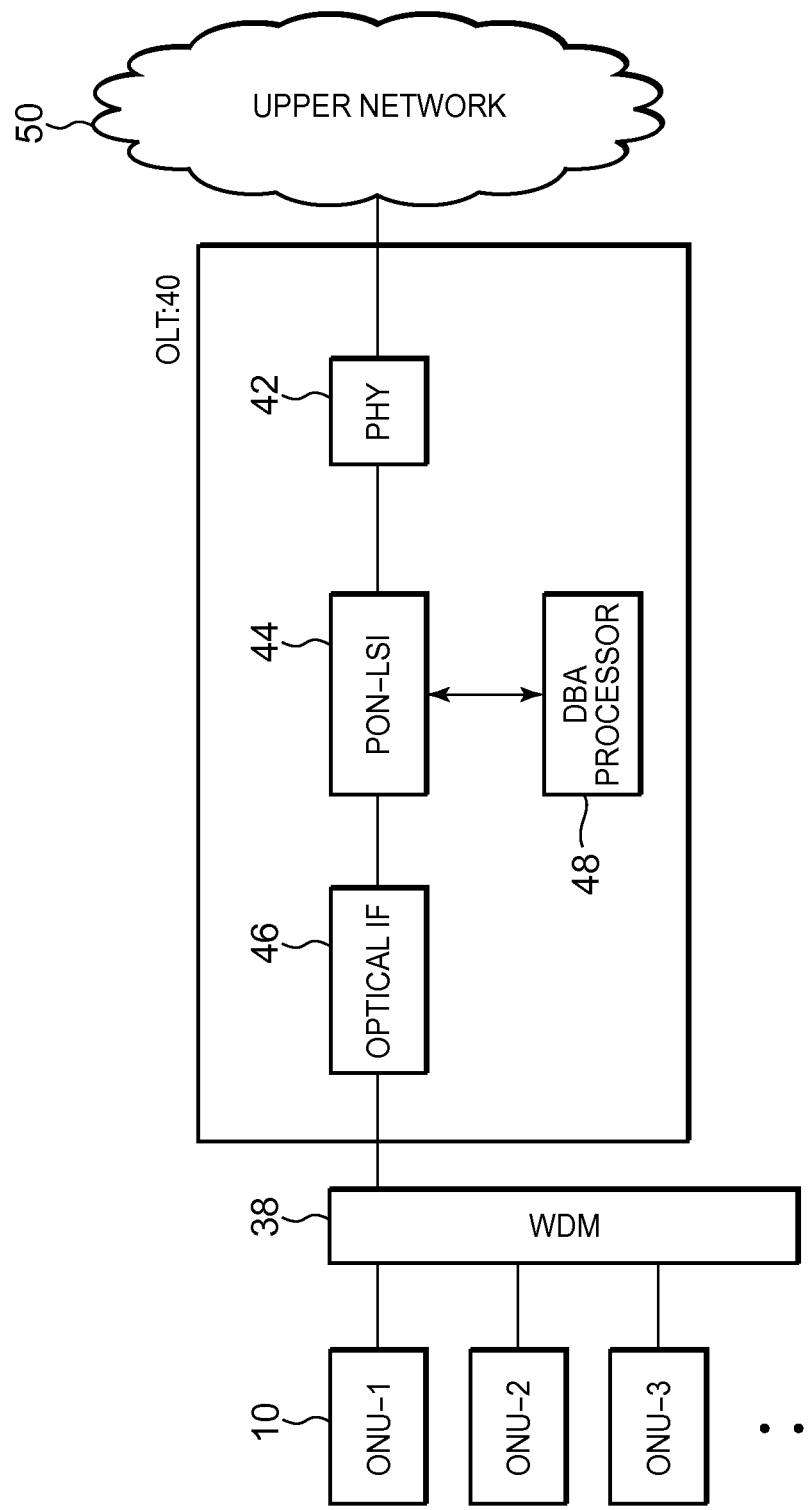
FIG. 1 shows an example of an optical communication network system in accordance with one or more embodiments described herein.

FIG. 1 shows a diagram of an optical communication network system. As shown in FIG. 1, the optical communication network system can include a plurality of ONUs 10 connected to an OLT 40. An ONU 10 can be connected to the OLT 40, for example, through a wavelength multiplexing/demultiplexing device 38 (hereinafter, referred to as WDM 38) such as star coupler. To be more precise, the OLT 40 and the WDM 38 can be connected by using an optical fiber cable. The WDM 38 and a plurality of the ONUs 10 can be connected, for example, by using a one-to-N star topology. Here, N denotes a natural number.

As shown in FIG. 1, the OLT 40 can comprise an optical interface 46 (hereinafter, referred to as optical IF 46), a passive optical network-large scale integration 44 (hereinafter, referred to as PON-LSI 44), a physical layer chip 42 (hereinafter, referred to as PHY 42), and a dynamic bandwidth allocation processor 48 (hereinafter, referred to as DBA processor 48). As explained later, the ONUs 10 can comprise an optical IF, a PON-LSI, and a PHY although those are not shown in FIG. 1.

The DBA processor 48 can allocate transmission timing of an upstream frame to be transmitted to each ONU 10 based on a well-known dynamic bandwidth allocating method. Accordingly, the ONU 10 can transmit the upstream frame to the OLT 40 at the allocated transmission timing.

In the optical access system shown in FIG. 1, a downstream frame can be transmitted from an upper network 50 to each ONU 10 through the OLT 40 and the WDM 38. On the other hand, an upstream frame can be transmitted from each ONU 10 to the upper network 50 through the WDM 38 and the OLT 40. Specifically, the WDM 38 can divide the downstream frame transmitted from the OLT 40 and transmit a divided signal to each ONU 10. The WDM 38 can also multiplex signals transmitted from the ONUs into the upstream frame and transmit the upstream frame to the OLT 40.

Figure 2:
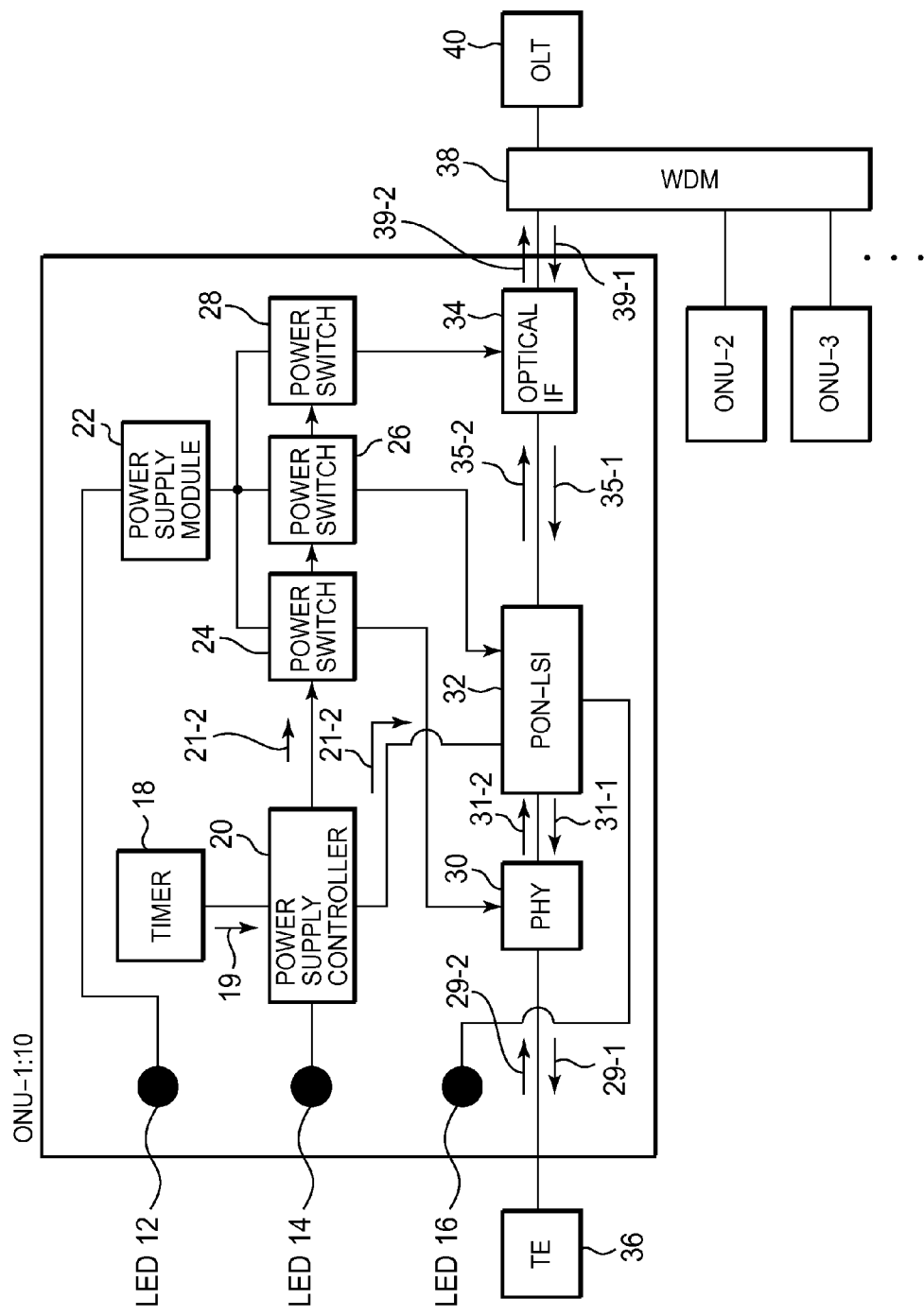
FIG. 2 shows an example of an ONU in the optical communication network system.

Next, the constitution and the operation of the ONUs 10, according to an exemplary embodiment, will be explained with reference to FIG. 2.

The ONUs 10 can be installed in a plurality of subscriber's premises respectively, and, in non-limiting embodiments, the constitution of each of the ONUs 10 can be the same. Therefore, as a representative sample of the ONUs 10, the constitution and the operation of an ONU-1 will be explained in detail below.

The ONU-1 can be connected to the OLT 40 through the WDM 38 to facilitate two-way communication between the ONU-1 and the OLT 40. Also, the ONU-1 can be connected to a terminal equipment (TE) 36, such as a personal computer (PC), via a wired local area network or a wireless local area network. The ONU-1 can comprise an optical IF 34, a PON-LSI 32, a PHY 30, a time 18, a power supply controller 20, power switches 24, 26 and 28, a power supply module 22 and LEDs 12, 14, and 16. The power switches 24, 26 and 28 can be or include electrical switches that supply electrical power to the corresponding one of the PHY 30, the PON-LSI 32 and the optical IF 34.

The ONU-1 can operate in a communication mode in which the ONU-1 may communicate with the OLT 40, and in a sleep mode in which the ONU-1 may not communicate with the OLT 40, or in which communication by the ONU-1 with the OLT 40 is suspended or reduced. In the communication mode, the power supply controller 20 can supply electrical power to the PHY 30, the PON-LSI 32 and the optical IF 34 to carry out the communication between the ONU-1 and the OLT 40. On the other hand, in the sleep mode, the power supply controller 20 can cut off or reduce the electrical power to the PHY 30, the PON-LSI 32 and the optical IF 34.

Figure 3:
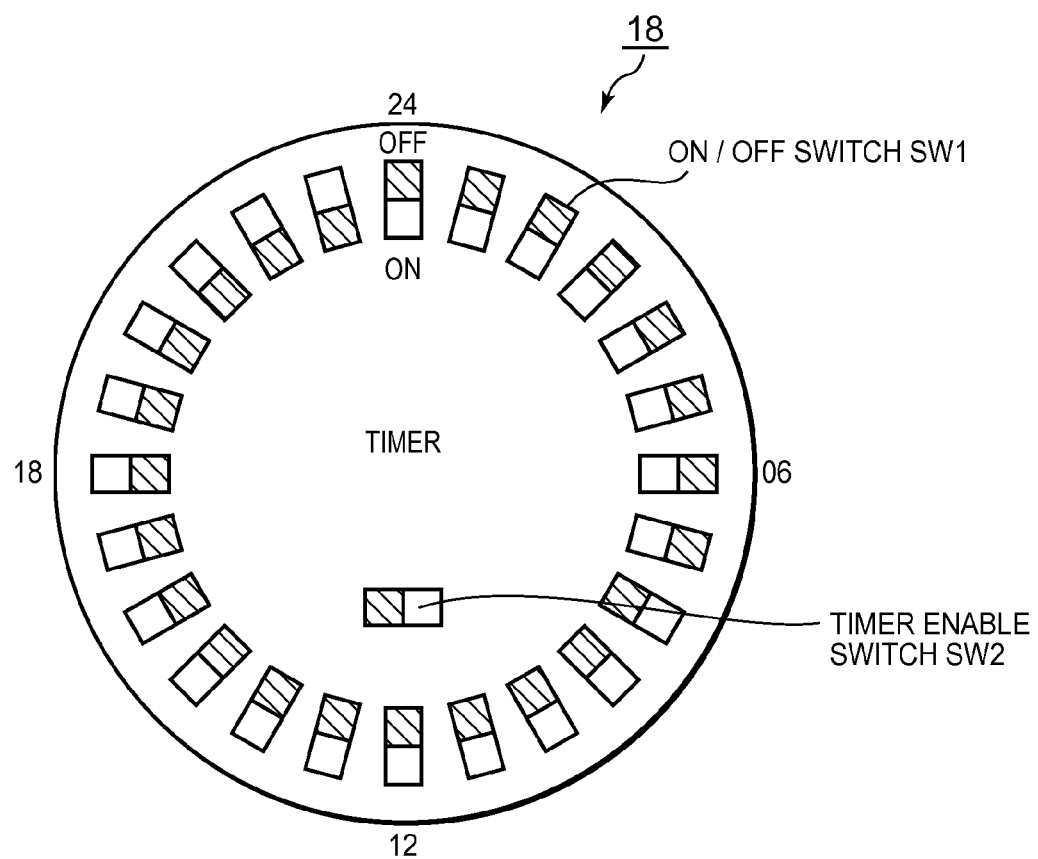
FIG. 3 shows examples of timers of an ONU in the optical communication network system.

Referring to FIG. 3, timer 18 can comprise an on/off switch SW1 and a timer enable switch SW2. The on/off switch SW1 can be configured to decide a first time period (hereinafter, referred to as operating time period) corresponding to the communication mode, and a second time period (hereinafter, referred to as idle time period) corresponding to the sleep mode. The timer enable switch SW2 can be configured to choose between an effective mode in which the ONU-1 performs the power supply control operation described here, and a disengaged mode in which the ONU-1 does not perform the power supply control operation.

Referring again to FIG. 2, the timer 18 can generate an operation time information signal 19 (hereinafter, referred to as time signal 19), which indicates the operating time period, the idle time period and the effective mode or the disengaged mode. The timer 18 can output the time signal 19 to the power supply controller 20.

The on/off switch SW1 and the timer enable switch SW2 can be realized by using, e.g., a DIP (dual in-line package) switch as shown in FIG. 3. Additionally or alternatively, the switches can be realized by software that is capable of operating as a virtual switching means of the ONU-1.

The power supply controller 20 can transfer to the PON-LSI 32 the time signal 19 received from the timer 18 (Arrow 21-1). Also, the power supply controller 20 can generate an operation time information signal 21-2 (hereinafter, referred to as "time signal 21-2") based on the time signal 19, and then transmit the time signal 21-2 to the power switches 24, 26 and 28. The power switches 24, 26 and 28 can carry out either supplying or cutting off or reducing electric power to the optical IF 34, the PON-LSI 32 and the PHY 30 according to the time signal 21-2.

In addition to the above-mentioned time signal 19, the power supply controller 20 can receive a software renewal time information signal (hereinafter, referred to as software renewal signal) from the OLT 40. Here, the software renewal signal can be or include a signal indicating a software renewal time period during which ONUs can update or install (e.g., download) a software program provided from the OLT 40. A software renewal operation of the ONUs 10 will be explained later.

The power supply controller 20 can generate the time signal 21-2 based on the time signal 19 and the software renewal signal, and send the time signal 21-2 to the power switches 24, 26 and 28. Specifically, the power supply controller 20 can read the software renewal time period from the software renewal signal, and judge whether the starting time of the software renewal time period is in an operating time period corresponding to the communication mode, or in an idle time period corresponding to the sleep mode.

If the starting time is in the idle time period, corresponding to the ONU-1 being in sleep mode, the power supply controller 20 can generate the time signal 21-2 and transmit it to the power switches 24, 26 and 28. In response to the time signal 21-2, the power switches 24, 26, and 28 can begin supplying electric power to the optical IF 34, the PON-LSI 32 and the PHY 30. Accordingly, the ONU-1 can switch from the sleep mode to the communication mode. Operating in the communication mode can include performing phase decision processing, DBA calculation processing and discovery processing, as defined in IEEE802.3ah, by at least one of ONUs or the OLT 40.

On the other hand, when the starting time is in the operating time period, that is, the ONU-1 is in communication mode, the power supply controller 20 can keep supplying electrical power to the optical IF 34, the PON-LSI 32 and the PHY 30, and start a download of a software program transmitted from the OLT 40. Additionally, when the ONU-1 is in the communication mode and actual data communication between the ONU-1 and the OLT 40 is carried out, the ONU-1 can interrupt the data communication and start the download of the software program as a matter of priority. Moreover, the ONU-1 can resume the data communication after the download of the software program or at least a portion of the software program. When the ONU-1 is in the communication mode, but actual data communication between the ONU-1 and the OLT 40 is not carried out, the ONU-1 can start the download of the software program transmitted from the OLT 40 immediately.

The optical IF 34 can convert an optical signal 39-1 transmitted from the OLT 40 into an electrical signal 35-1 and output it to the PON-LSI 32. Also, the optical IF 34 can convert an interface signal 35-2 transmitted from the PON-LSI 32 into an optical signal 39-2 and output it to the OLT 40 via the WDM 38.

The PON-LSI 32 can receive an electrical signal 35-1 outputted from the optical IF 34. Accordingly, the PON-LSI 32 can establish a communication link between the ONU-1 and the OLT 40 by carrying out the prescribed process specified in IEEE802.3ah and output a signal 31-1 to the PHY 30. Similarly, the PON-LSI 32 can carry out the prescribed process to an interface signal 31-2 received from the PHY 30.

The PON-LSI 32 can convert the interface signal 31-2 into an interface signal 35-2 and output the interface signal 35-2 to the optical IF 34. Furthermore, the PON-LSI 32 can receive a time information signal 21-1 from the power supply controller 20, and send it to the OLT 40 through the optical IF 34.

The PHY 30 can convert a signal 31-1 output from the PON-LSI 32 into an Ethernet signal 29-1 and then output it to the TE 36. Also, the PHY 30 can convert an Ethernet signal 29-2 output from the TE 36 into an interface signal 31-2, and output the interface signal 31-2 to the PON-LSI 32.

The power supply module 22 can be connected with the optical IF 34, PON-LSI 32 and the PHY 30 through the power switches 24, 26 and 28. The power switches 24, 26 and 28 can supply, cut off or reduce electrical power from the power supply module 22 to the optical IF 34, PON-LSI 32 and the PHY 30 in accordance with the time signal 21-2 received from the power supply controller 20.

Specifically, when it is time to start the communication mode of the ONU-1, the power supply controller 20 can direct the power switches 24, 26, and 28 to supply electrical power to the optical IF 32, the PON-LSI 34 and the PHY 30 by using the time information signal 21-1. Also, when it is time to start the sleep mode of the ONU-1, the power supply controller 20 can direct the power switches 24, 26, and 28 to cut off or reduce the electric power to the optical IF 32, the PON-LSI 34 and the PHY 30 based on the time information signal 21-1.

Next, an LED 12, an LED 14, and an LED 16 will be explained. The LEDs 12, 14 and 16 can be used to notify a user of an operating situation of the ONU 10. The LED 12 can light up on the condition that the power supply module 22 supplies electrical power to at least one of the PHY 30, the PON-LSI 32 and the optical IF 34. The LED 14 can light up on the condition that the enable switch SW2 is set to the effective mode mentioned above. The LED 16 can light up on the condition that the communication link between the OLT 40 and the ONU-1 is established.

With reference to FIG. 3, the timer 18 will be explained below. The timer 18 can comprise the on/off switch SW1 and the timer enable switch SW2. The on/off switch SW1 can be or include a switch for deciding the operation time period during which the power supply module 22 supplies electrical power to the optical IF 34, the PON-LSI 32 and the PHY 30, and deciding the idle time period during which the power supply module 22 cuts off or reduces the electrical power. That is, the operating time period can correspond to the communication mode of the ONUs 10, and the idle time period can correspond to the sleep mode of the ONUs 10. The timer enable SW2 can be or include a switch for choosing between the above-mentioned effective mode for performing the power supply control operation, and the disengaged mode in which the power supply control operation is not performed.

As shown in FIG. 3, the switch SW1 can comprise a plurality of DIP switches, e.g., 24 DIP switches. The plurality of DIP switches can be arranged, for example, about the circumference of a circle. The 24 DIP switches can correspond to 24 hours respectively. Specifically, a DIP switch-24 can indicate a time 00:00 (or 24:00), a DIP switch-06 can indicate a time 06:00, a DIP switch-12 can indicate a time 12:00, and a DIP switch-18 can indicate a time 18:00. Consequently, by switching of the 24 switches, the operation time period and the idle time period can be configured or decided by a unit of one hour. In embodiments, switches of the timer 18 can employ a shorter unit, e.g. 30 minutes, or 15 minutes, and the number of the DIP switches can be correspondingly increased.

To facilitate the operations between the ONU 10 and the OLT 40, the ONU 10 including the timer 18 can be synchronized with the OLT 40. For example, the OLT 40 can comprise a clock generator that generates a clock signal, and then sends it to the ONU 10 on a downstream frame. The ONU 10 can extract the clock signal and perform the operations based on the clock signal. Here, it is well-known technique to extract a clock signal transmitted from the OLT 40.

FIG. 3 shows an example of the timer 18 which can decide the operating time period corresponding to the communication mode and the idle time period corresponding to the sleep mode. As shown in the example of FIG. 3, the timer 18 can indicate that the DIP switch-24 and DIP switches-1 to 7 are set to a switch-ON mode, and that the DIP switches-07 to 23 are set to a switch-OFF mode. That is, the timer 18 can indicate that the ONU 10 enters or is in the sleep mode from 00:00 until 08:00, and is in the communication mode from 08:00 until 00:00. Moreover, the timer 18 can generate the operation time information signal 19 (time signal 19) that includes the operating time period and the idle time period, and transmit it to the power supply controller 20.

The timer 18 can also comprise a timer enable switch SW2 that can enable choosing an effective mode in which the ONU 10 performs the power supply control operation, and a disengaged mode in which the ONU 10 does not perform the power supply control operation, in addition to the on/off switch SW1 mentioned above. Accordingly, the ONU 10 can perform the power supply control operation based at least partly on the switch SW2 being set to the effective mode.

In other words, if the timer enable switch SW2 is in the disengaged mode, the ONU 10 can perform the predetermined operations of a conventional ONU. In this case, the ONU 10 may not perform the power supply control operation that supplies or cuts off or reduces electrical power to the optical IF 34, the PON-LSI 32 and the PHY, notwithstanding the setting mode of the on/off switch SW1.

Figure 4:
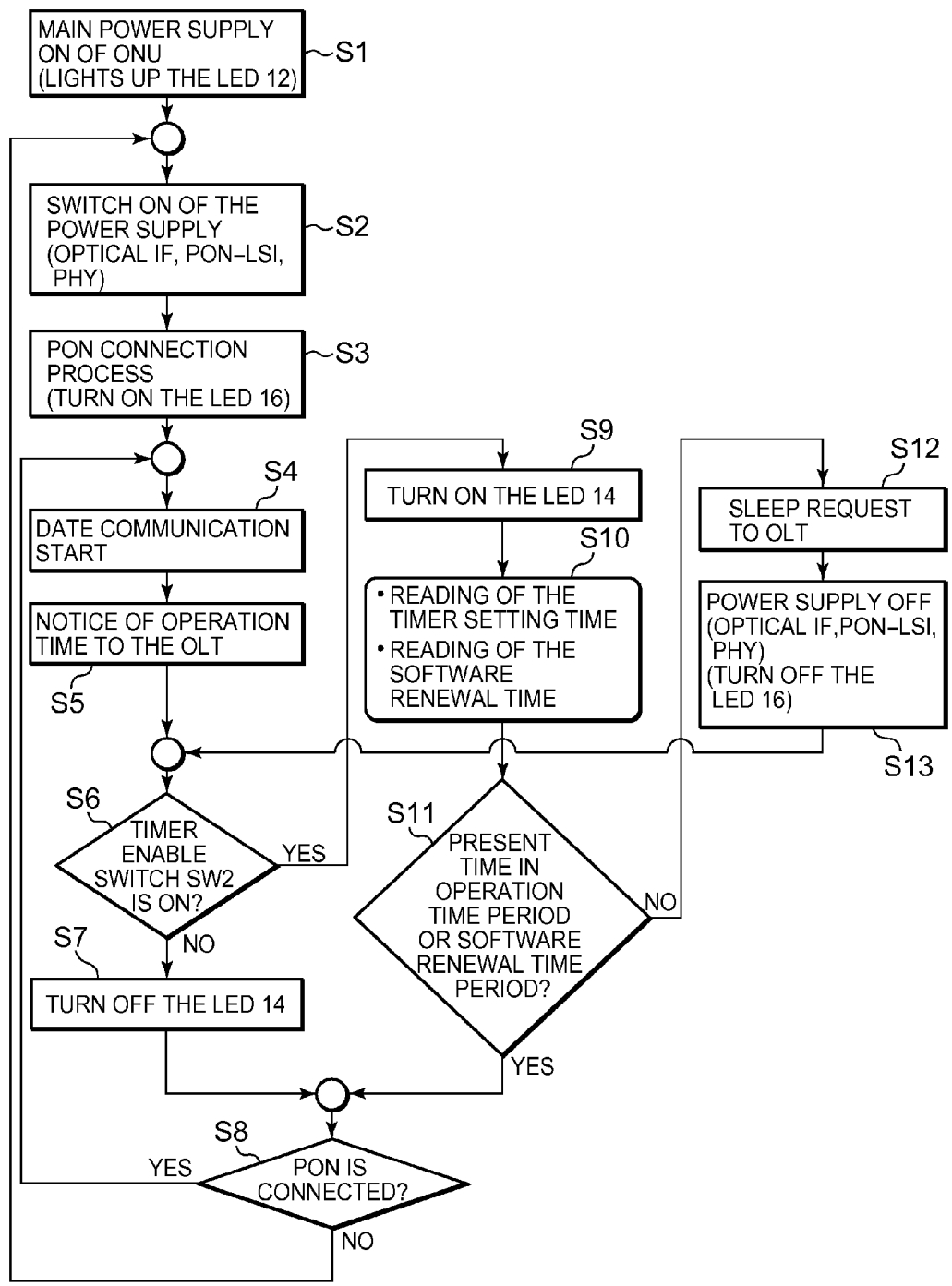
FIG. 4 shows a flow chart that indicates operations of an ONU.
Figure 5:
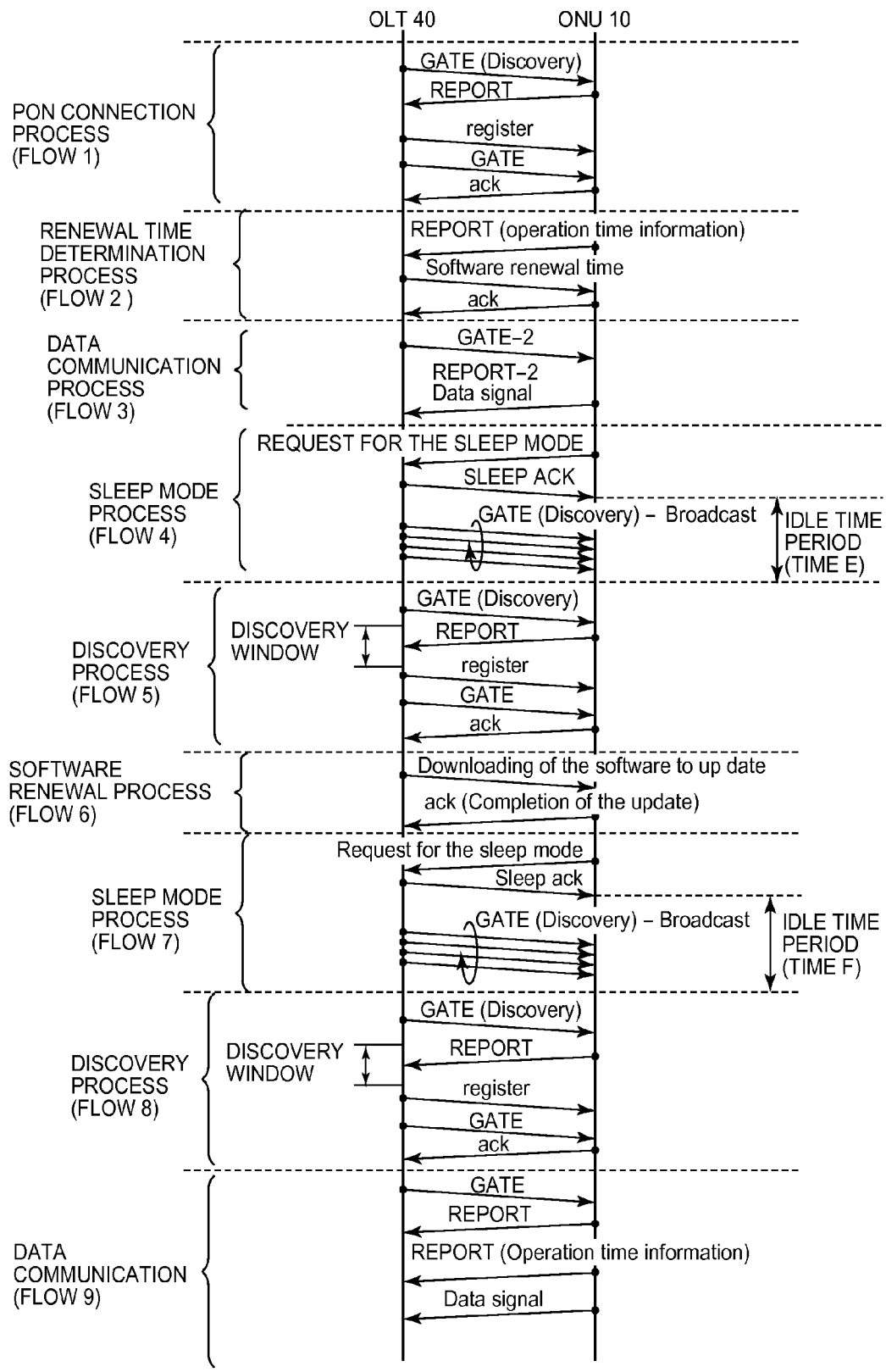
FIG. 5 shows a sequence chart that illustrates a flow of signal processing between an OLT and an ONU.

A power supply control method of the ONU 10 will be explained with reference to FIGS. 4 and 5. FIG. 4 is a flowchart indicating a process of the power supply control method of the ONU 10. FIG. 5 is a sequence chart which shows a stream of signals between the OLT 40 and the ONU 10. The sequence chart shown in FIG. 5 indicates signals that can be exchanged between the OLT 40 and the ONU 10.

The power supply control method of the ONU 10 can comprise steps S1 to S13. In step S1, the ONU 10 can be switched on by pressing of the main switch. When the ONU 10 starts, a predetermined software program can be performed automatically by a CPU and a memory of the ONU 10. As a result of executing the software program, the ONU 10 can perform operations in a communication mode and a sleep mode by using the power supply controller 20. In response, the LED 12 can light up.

In step S2, the power switches 24, 26 and 28 can supply electrical power from the power supply module 22 to the optical IF 34, the PON-LSI 32 and the PHY 30 in accordance with a control instruction that indicates the communication mode by the power supply controller 20.

In step S3, the ONU 10 can carry out a passive optical network (PON)-LINK interconnection process in order to establish a PON-LINK between the OLT 40 and the ONU 10. At this time, the LED 16 can light up in order to inform its user of the establishment of the PON-LINK.

Here, the above-mentioned step S3 can be the same as a discovery process (Flow 1) which is shown in FIG. 5 and explained later.

In step S4, the ONU 10 can start the data communication with the OLT 40. In an initiation of the data communication, the OLT 40 can notify the ONU 10 of the start time of the data communication by using a GATE frame (GATE-2) shown in data communication process (Flow 3) of FIG. 5. The GATE frame can include information regarding the start time and data volume that is operable to communicate between the OLT 40 and the ONU 10. The ONU 10 can transmit data signals on the upstream frame to the OLT 40 according to the information.

Also, the ONU 10 can periodically transmit to the OLT 40 a REPORT frame (REPORT-2; see FIG. 5) which is utilized for a calculation of the dynamic bandwidth allocation (DBA) which is performed by the DBA processor installed in the OLT 40. The REPORT frame can include data volume that is stored in the memory buffer of the ONU 10. The OLT 40 can determine both the data volume which the ONU 10 is operable to transmit, and a time slot on the upstream frame based on the information on the REPORT frame.

As mentioned above, the GATE frame and the REPORT frame can be communicated between the OLT 40 and the ONU 10 in steps S3 and S4. Accordingly, two-way communication can be established by a time division multiple access (TDMA) connection. The procedures of steps S3 and S4 can be performed, for example, according to the IEEE 802.3ah standard and are well known technique in an ONU of optical communication systems.

In step S5, the ONU 10 can be set to the communication mode, and the PON-LSI 32 can perform operations for informing the OLT 40 of an operating time period corresponding the communication mode and an idle time period corresponding to the sleep mode, which are determined by the timer 18. Here, it may be possible to perform step S5 periodically when the ONU 10 is in the communication mode.

In step S6, the power supply controller 20 can receive and recognize timer enabling information determined by the time enable switch SW2 of the timer 18. Accordingly, the power supply controller 20 can judge whether the time enable switch SW2 is switched on, indicating performance of the power supply control operation, or switched off, indicating that the power supply control operation is not performed.

The timer 18 may transmit to the power supply controller 20, for example, an instruction signal indicating "1" or "0" corresponding to a switched-on condition or a switched-off condition, respectively. The timer enabling information or the instruction signal can be memorized, e.g., stored, in a memory of the power supply controller 20. Consequently, when the information or the signal indicates "0", the power supply controller 20 can be caused to not perform the power supply control operation of the ONU 10, and step S7 can be performed after step S6.

On the other hand, when the information or the signal indicates "1", the power supply controller 20 may perform the power supply control at the timing determined by the on/off switch SW1 and step S9 can be performed after step 6.

In step S7, the power supply controller 20 can turn off the LED 14. Accordingly, the LED 14 can inform its user that the ONU 10 is not performing the power supply control operation in spite of any condition of the on/off switch SW1.

In step S9, the power supply controller 20 can turn on the LED 14. Accordingly, the LED 14 can inform its user that the ONU 10 is performing according to a condition set by the on/off switch SW1.

The following steps S10 and S11 can be performed after step S9. The power supply controller 20 of the ONU 10 can read out the operating time period, the idle time period, the software renewal time period stored in its memory. Next, in step S11, the power supply controller 20 can judge or determine whether the present time is in (e.g., occurs in) the operating time period or in the idle time period. Based on a judgment by the power supply controller 20 that the present time is in the operating time period, step S8 can be performed. On the other hand, based on a judgment by the power supply controller 20 that the present time is in the idle time period, step S12 can be performed.

In step S12, the ONU 10 can transmit to the OLT 40 a request signal indicating a request for changing from the communication mode to the sleep mode. Subsequently, in step S13, the PON-LSI can disconnect the communication link between the OLT 40 and the ONU 10, and the ONU 10 can change from the communication mode to the sleep mode. In this case, the LED 16 can go off and inform its user of the disconnection of the communication link between the OLT 40 and the ONU 10.

Also, in step S11, if the power supply controller 20 determines that the present time is in the operating time period or in the software renewal time period, the ONU 10 can perform step S8 to resume the communication mode by reestablishing the communication link. On the hand, if in step S11, the power supply controller 20 determines that the present time is neither in the operating time period nor in the software renewal time period, the power supply controller 20 can perform step S12 in order that the ONU 10 switches from the communication mode to the sleep mode.

In step S12, the ONU 10 can transmit the request signal to the OLT 40 as shown in Flows F4, F7 of FIG. 5 in order that the ONU 10 changes from the communication mode to the sleep mode. Furthermore, the ONU 10 can receive a sleep ack frame transmitted from the OLT 40. As a result, the ONU 10 can cut off or reduce electrical power to the optical IF 34, the PON-LSI 32 and the PHY 30 by controlling the switches 28, 26, 24. Specifically, the switches 28, 26, 24 can receive the above-mentioned operation time information signal 21-2 from the power supply controller 20, and cut off or reduce the electrical power to the optical IF 34, the PON-LSI 32 and the PHY 30 in response to the reception of the signal 21-2.

Next, the transition process for changing from the sleep mode to the communication mode will be explained with reference to FIG. 4.

Although the ONU 10 is in the sleep mode, the power supply controller 20 can perform steps S6-S11 periodically. Similarly, although the ONU 10 is in the sleep mode, the OLT 40 can periodically broadcast to the ONU 10 a GATE frame shown in the idle time period (Time E and Time F) of FIG. 5. Consequently, the ONU 10 can be able to always re-establish the communication link between the OLT 40 and the ONU 10 by supplying the electrical power to the optical IF 34, the PON-LSI 32 and the PHY30.

If the ONU 10 is in the sleep mode and its user sets the ONU 10 to the communication mode by operating the timer enable switch SW2 (e.g. "No" in step S6), or if the ONU 10 is in the sleep mode and it is time to start the communication mode of the ONU 10 (e.g. "Yes" in step S11), step S8 can be performed. In this case, the communication link may not be established during the sleep mode. Instead, electrical power can be supplied to the optical IF 34, the PON-LSI 32 and the PHY30 in step S2, and the communication link can be established in step S3.

A transition process switching from the sleep mode to the communication can be performed by utilizing the discovery process of the optical communication network system, as explained below with reference to Flows 5 and 8 of FIG. 5

In the discovery process (Flows 5 and 8), the OLT 40 can transmit a GATE frame ("Discovery") to all of the ONUs 10. The ONUs 10 can receive the GATE frame (Discovery) transmitted from the OLT 40. The GATE frame (Discovery) can include transmission timing of signals to be transmitted from ONUs 10 to the OLT 40. Accordingly, even if an identification code (hereinafter, referred to as "LLID") of an ONU 10 is not registered with the OLT 40, the unregistered ONU 10 can determine transmission timing based on the transmission timing that is indicated on the GATE frame.

The unregistered ONU 10 can transmit a reply including a register request frame (shown in FIG. 5 as "REPORT".) to the OLT 40. The register request frame can include time information T2 that the ONU 10 transmits in the register request frame to the OLT 40.

The OLT 40 can receive the register request frame and calculate the distance between the ONU 10 and the OLT 40 based on both time information T1 and the time information T2. The OLT 40 can insert the allowable transmitting timing into the GATE frame and transmit the GATE frame to the ONU 10.

The OLT 40 can transmit a registry determination frame (shown in FIG. 5 as "register") which indicates the LLID to the unregistered ONU 10. Also, the OLT 40 can input into a GATE frame the timing information that indicates transmitting timing for the unregistered ONU 10, and transmit the GATE frame to the unregistered ONU 10. The unregistered ONU 10 can transmit a register-ack frame (shown in FIG. 5 as "ack") to the OLT40 at the timing of the transmitting timing indicated in the GATE frame.

The discovery process can be completed by transmitting the register-ack frame from the unregistered ONU 10 to the OLT 40, and then the communication link between the unregistered ONU 10 to the OLT 40 can be established.

As shown in FIG. 5, the data communication process performed after the discovery process can be the same as the common data communication process after the PON connection process explained above.

The ONU 10 can transmit to the OLT 40 the time information signal 21-1 (time signal 21-1) after performing the PON connection process (Flow 1) shown in FIG. 5 or after performing step S4. Here, the time signal 21-1 can include the operating time period and the idle time period indicated by the on/off switch SW1. Furthermore, the time information can include the effective mode or the disengaged mode indicated by the timer enable switch SW2.

The OLT 40 can receive the time information signal 21-1, and then make up, e.g., build or generate, or renew or update, a management table as shown in FIG. 8. Accordingly, the OLT 40 can determine the software renewal time in consideration of, e.g., based at least partly on, the idle time period and/or the operating time period. Specifically, the OLT 40 can determine the software renewal time so that all or most, e.g., a majority, of the ONUs can perform the software renewal process during the sleep mode. The OLT 40 can inform the ONUs of the software renewal time. The ONU 10 can receive the software renewal time and provide it to the power supply controller 20.

In the communication mode, the ONU 10 can establish the communication link with the OLT 40 and start the data communication. Next, when it is time to start the sleep mode, the ONU 10 can cut off or reduce electrical power to the optical IF 34, PON-LSI 32 and PHY 30. Then, the ONU can switch from the communication mode to the sleep mode.

Also, when it is time to start the software renewal time in the sleep mode, the ONU 10 can supply electrical power to the optical IF 34, PON-LSI 32 and PHY and reestablish the communication link with the OLT 40 by performing the above-mentioned PON connection process. After the establishment of the communication link, the ONU 10 can update the software program transmitted from the OLT 40.

Figure 9A:
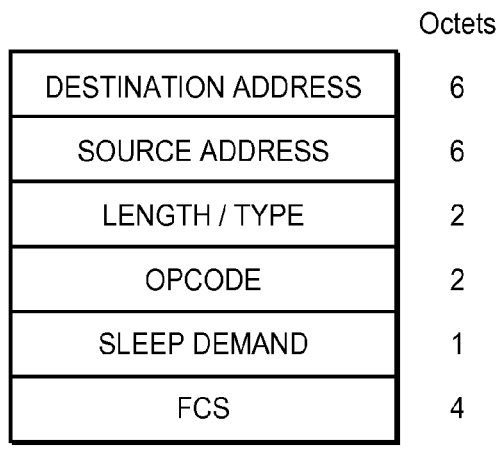
FIGS. 9A, 9B and 9C respectively show a sleep request signal, a sleep ack signal and a software renewal time signal associated with the optical communication network system.

The transition process switching from the communication mode to the sleep mode can be carried out based on a sleep request signal transmitted from the ONU 10 to the OLT 40 when it is time to start the sleep mode that is set up by the timer 18. The sleep mode signal is illustrated in FIG. 9A and explained later. Next, the OLT 40 can transmit a sleep ack signal to the ONU 10 in response to the reception of the sleep mode signal.

The ONU 10 can cut off or reduce electrical power to the optical IF 34, the PON-LSI 32 and the PHY 30 after receiving the sleep ack signal. Accordingly, the ONU 10 may switch from the communication mode to the sleep mode. In the sleep mode, the power supply controller 20 can perform time management of the operation time period corresponding to the communication mode, the idle time period corresponding to the sleep mode, and the software renewal time. When it is time to start the communication mode, or the software renewal operation, the ONU 10 can resume supplying the electrical power to the optical IF 34, the PON-LSI 32 and the PHY in order to set the ONU 10 to the communication mode.

Next, the decision process for deciding to start the software renewal operation when the ONU 10 is in the sleep mode will be explained. In FIG. 5, the decision process corresponds to a renewal time determination process (Flow 2).

When the ONU 10 is in the sleep mode and it is time to start the software renewal time period, the power supply controller 20 can resume supplying the electric power supply to the optical IE 34, PON-LSI 32 and the PHY30. After resuming the power supply, the PON-LSI 32 can carry out the restoration process for establishing the PON-LINK between the ONU 10 the OLT 40.

The restoration process can be to re-establish the communication link between the ONU 10 and the OLT 40, when ONU 10 is in the sleep mode and is disconnected from the OLT 40 on the PON-LINK. Therefore, the above-mentioned discovery process can be utilized for the restoration process of the PON-LINK. The discovery process can include the function of establishing the PON-LINK without interrupting the communication between the OLT 40 and other ONUs.

In the discovery process, a discovery signal included in the GATE frame can be broadcast from the OLT 40 periodically. The OLT 40 can instruct an unregistered ONU 10, including a new ONU or an ONU that is in the sleep mode, to transmit a register request signal to the OLT 40, The discovery process is illustrated in FIG. 5 as the discovery process (Flows 5 and 8).

The unregistered ONU 10 can transmit to the OLT 40 a report signal (shown in FIG. 5, as "REPORT") that indicates the reception of the discovery signal. At this time, the report signal can be transmitted in accordance with the transmission timing and data volume indicated in the GATE frame. Thereby, it can be possible to avoid interference between the signals transmitted from a plurality of ONUs.

The OLT 40 can stand by to receive the report signal by opening a discovery window after transmitting the discovery signals. The OLT 40 can also perform the registration procedure for registering the unregistered ONU 10 if the report signal can be received in the predetermined time period that opens the discovery windows. The OLT 40 can transmit a register signal to the unregistered ONU 10, and notify the unregistered ONU of the completion of the registration process.

Furthermore, the OLT 40 can transmit a GATE signal to the unregistered ONU 10 and notify the unregistered ONU 10 of the data volume and transmitting timing in which the unregistered ONU 10 can transmit. The unregistered ONU 10 can transmit an ack signal to the OLT 40 and notify the OLT 40 of the reception of the gate signal.

As shown in FIG. 5 as Flow 5, after the re-establishment of the PON-LINK, the ONU 10 can stand by to receive software programs transmitted from the OLT 40. The ONU 10 can perform a software renewal operation after receiving the software programs, and transmit to the OLT 40 an ack signal that indicates the completion of the software renewal operation. Thereby, the software renewal operation of the ONU 10 can be completed.

The ONU 10 can judge whether the present time is included, e.g., occurs, in the operating time period or in the idle time period after the replacement of software is completed. When the present time is included in the operating time period, the ONU 10 can continue supplying the electric power to the optical IF 30, the PON-LSI 32 and the PHY 30. On the other hand, when the present time is included in the idle time period, the ONU 10 can cut off or reduce the electric power to the optical IF 30, the PON-LSI 32 and the PHY 30.

The flow 8 of FIG. 5 shows a restoration process from the sleep mode to the communication mode of the ONU 10. In this case, the power supply controller 20 can resume supplying the electric power to the optical IF 34, the PON-LSI 32, and PHY 30.

Next, signal processing which is carried out by the PON-LSI 32 and the power supply controller 20 of the ONU 10 and is a main flow necessary for the power supply control will be explained Specifically, the PON-LSI 32 and the power supply controller 20 can carry out the signal processing shown in Table 1.

TABLE 1

| Execution part of signal processing | Content of signal processing |
|---|---|
| PON-LSI 32 | PON connection process |
| | (Flow 1 of FIG. 5, Step S3 of FIG. 4) |
| | Notice of operation time to the OLT 40 |
| | (Flow 2 of FIG. 5, Step S5 of FIG. 4) |
| | Sleep request to the OLT 40 |
| | (Flow 4 of FIG. 5, Step S12 of FIG. 4) |
| Power supply controller 20 | Judgment of the enable switch SW2 |
| | (Step S6 of FIG. 4) |
| | Reading of the ON/OFF switch SW1 |
| | (Step S10 of FIG. 4) |
| | Reading of the software renewal time |
| | (Step S10 of FIG. 4) |
| | Decision of the operating time period or in the idle time period |
| | (Step S11 of FIG. 4) |

Figure 6:
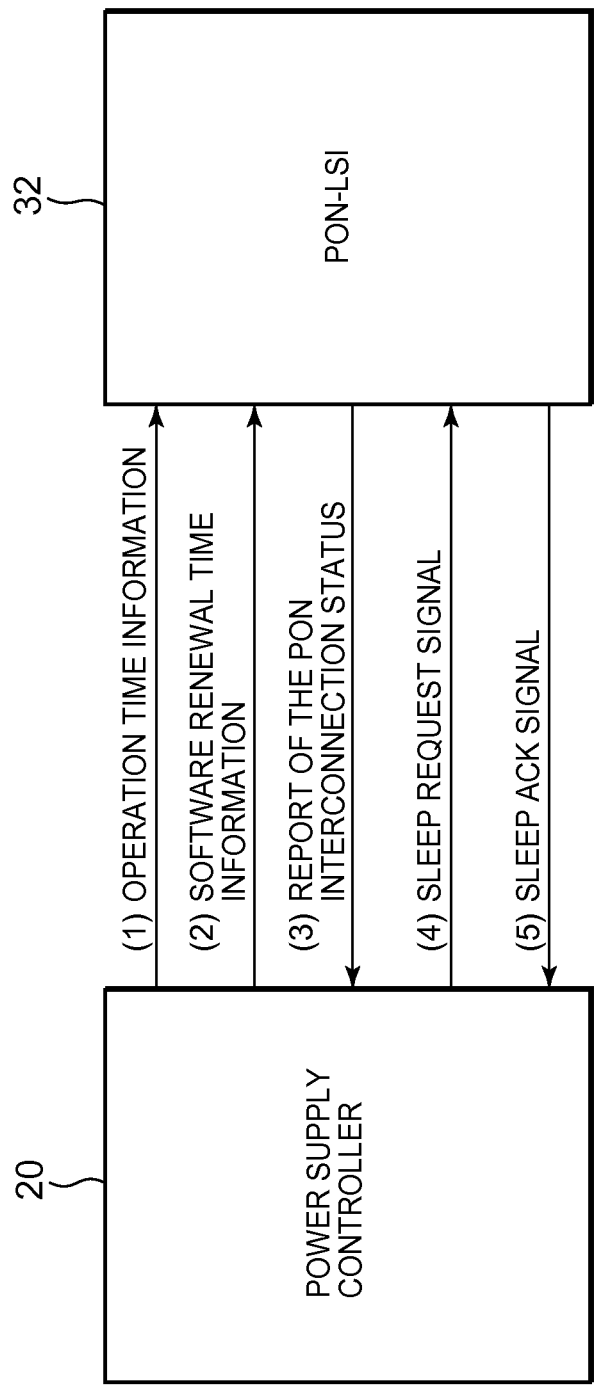
FIG. 6 shows a block diagram that illustrates communication between a power supply controller and a PON-LSI (passive optical network-large scale integration) associated with the optical communication network system.

With reference to FIG. 6, signal processing between the power supply controller 20 and the PON-LSI 32 will be explained in connection with the above-mentioned signal processing of steps S5, S6, S8, S10, S11, and S13 shown in FIG. 4.

(1) Notice of operation time information shown in FIG. 6 indicates a process in which the power supply controller 20 can notify the OLT 40 of operating time information including the operating time period and the idle time period that are provided from the timer 18, by transmitting the time signal 19 via the PON-LSI 32. The timer 18 can transmit the time signal 19 to the power supply controller 20. The power supply controller 20 can receive the time signal 19 and extract the operating time information from the time signal 19. The power supply controller 20 can put the operation time information into the time signal 21-2 and transmit the signal 21-2 to the PON-LSI 32. Accordingly, the PON-LSI 32 can notify the OLT 40 of the operation time information.

(2) Notice of software renewal time information shown in FIG. 6 indicates a process for notifying the ONUs of software renewal time determined by the OLT 40. The OLT 40 can receive the operating time information transmitted from the PON-LSI 32 and make up (e.g., build or generate), or renew or update, a management table, and store the idle time period and/or the operating time period in the management table. The OLT 40 can determine the software renewal time in consideration with, e.g., based at least partly on, the idle time period and/or the operating time period of the management table. Specifically, the OLT 40 can determine the software renewal time so that all or most, e.g., a majority, of the ONUs can perform the software renewal process during the sleep mode. The OLT 40 can notify the PON-LSI 32 of each ONU of the software renewal time. The PON-LST 32 can receive the software renewal time and provide it to the power supply controller 20.

(3) Report of the PON interconnection status shown in FIG. 6 indicates a process in which the PON-LSI 32 informs the power supply controller 20 of the establishment of the PON link between the ONU 10 and the OLT 40. The power supply controller 20 can carry out step S8 shown in FIG. 4 based on the report of the establishment of the PON link between the ONU 10 and the OLT 40.

(4) Sleep request signal and (5) Sleep ack signal shown in FIG. 6 indicate a transition process in which ONU 10 changes from the communication mode to the sleep mode. The transition process corresponds to the Flows 4 and 7 of FIG. 5, and step S12 of FIG. 4. The power supply controller 20 can transmit a sleep request signal requesting that the ONU 10 change from the communication mode to the sleep mode to the OLT 40 through the PON-LSI 32. One possible specific constitution, according to an exemplary embodiment, of the sleep request signal will be described later.

The OLT 40 can transmit a sleep ack signal to the power supply controller 20 though the PON-LSI 32 if the OLT 40 permits the ONU 10 to change from the communication mode to the sleep mode. (5) The sleep ack signal can be a signal which notifies the power supply controller 20, through the PON-LSI 32 from the OLT 40, of the permission to the ONU 10 to shift to the sleep mode. The power supply controller 20 can generate the time signal 21-2 based on the sleep ack signal, and then transmit the time signal 21-2 to the power switches 24, 26 and 28. The power switches 24, 26 and 28 can carry out either supplying or cutting off or reducing of electric power to the optical IF 34, the PON-LSI 32 and the PHY 30 according to the time signal 21-2.

Figure 7:
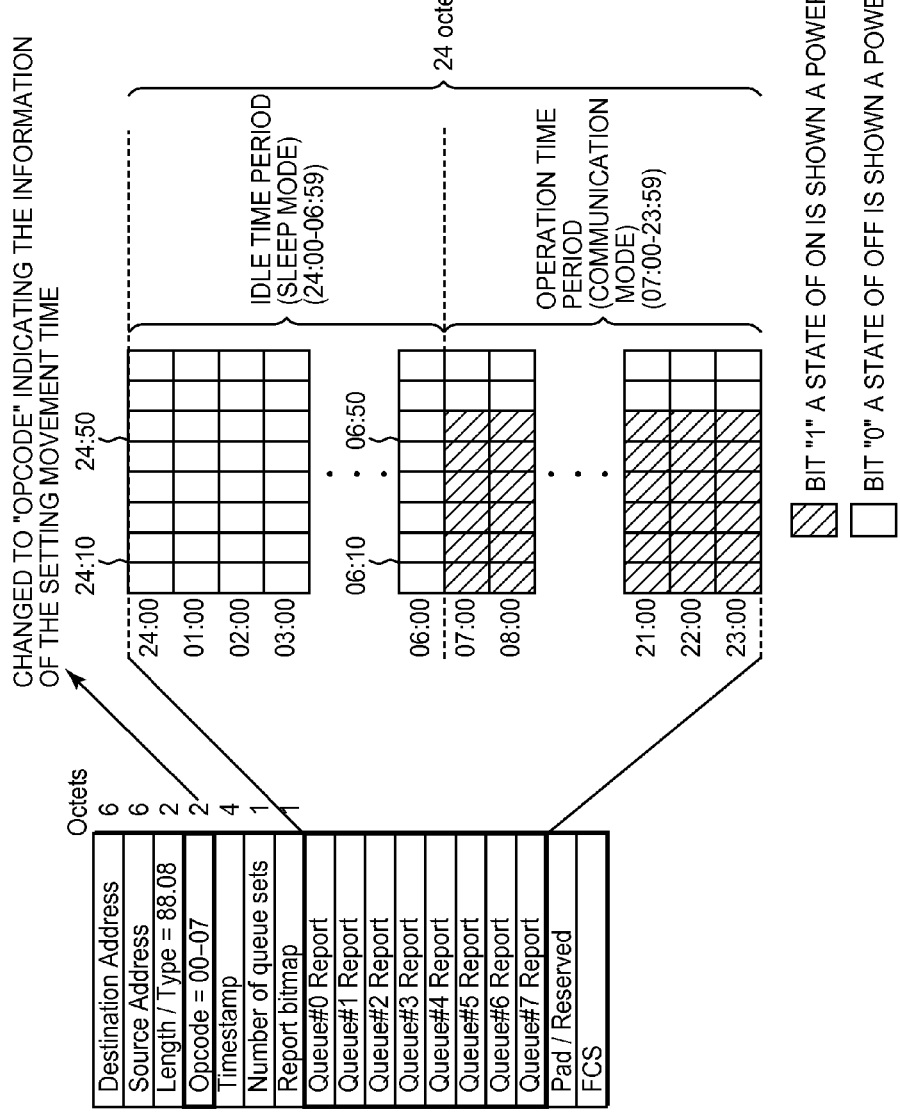
FIG. 7 illustrates an operation time information frame in accordance with one or more embodiments described herein.

One exemplary embodiment of the operating time information frame that is transmitted from the power supply controller 20 to the OLT 40 via the PON-LSI 32 will be explained below with reference to FIG. 7. The setting movement time information that can be transmitted by OLT40 through the PON-LSI 32 from the power supply controller 22 is also explained with reference to FIG. 7. FIG. 7 also illustrates the operating time information frame which can be used to notify the OLT 40 of the time information regarding the communication time period and the idle time period determined by the timer 18.

As shown in FIG. 7, the operating time information frame can include a Destination Address field, a Source Address field, a Length/Type field, an Opcode field, a Timestamp field, a Report bitmap field, Queue#0-7 Reports fields, a Pad/Reserved field, and an FCS field. The fields relating to the power supply control can include the Opcode field and the Queue#0-7 Reports fields.

The Opcode field may be used to identify kinds of information inserted in the Queue#0-7 Reports fields. Furthermore, the Queue#0-7 Reports fields may be used to indicate the operation time period and the idle time period set by the on/off switch SW1. In the right side of FIG. 7, the Queue#0 Reports field through the Queue#7 Reports field are illustrated. The Queue#0 Reports field through the Queue#7 Reports field can indicate the idle time period corresponding to the sleep mode and the operation time period corresponding to the communication mode. To be more precise, in the example of FIG. 7, the idle time period starts at 24:00 and ends at 06:59, and the operation time period starts at 07:00 and ends at 23:59.

Each field of the Queue#0 Report" to the Queue#7 Report shown in FIG. 7 can comprise 8 bits, where the 1st bit to the 6th bit are used to indicate the idle time period and the operation time period. That is, for example, one bit of the Queue#0-7 Reports fields can be assigned to a unit of 10 minutes. Here, in FIG. 7, a square block covered with slash marks represents a logical symbol "1" and the operation time period. On the other hand, a square block not covered with slash marks represents a logical symbol "0" and the idle time period.

By utilizing the Opcode field and the Queue#0 Report through the Queue#7 Report fields, it is possible to notify the OLT 40 of the operation time period and the idle time period. The OLT 40 can extract the contents of the Queue#0 Report through the Queue#7 Report fields and register the contents in the management table installed in the DBA processor 48.

FIG. 8 shows an example of the management table and operation time periods corresponding to the communication of ONUs 1-3. The remaining time period not shown in FIG. 8 represents the idle time periods of ONUs 1-3. The OLT 40 can update the management table whenever the operating time information frame is transmitted from each ONU 10.

The OLT 40 can extract the operation time information from the operating time information frame, and control the operation time period and the idle time period of all ONUs by making up, e.g., building or generating, and updating the management table. The OLT 40 can determine the software renewal time based on the information including the operation time period and the idle time period of all ONUs. The software renewal time can be determined so that all or most, e.g., a majority, of the ONUs can perform the software renewal procedure during the idle time period.

In the case shown in FIG. 8, the software renewal time, for example, can be determined to extend from 24:00 (00:00) to 07:00, because all of the ONUs1-3 are in the sleep mode all of that time.

Also, if there is no time that all of the ONUs 1-3 are in the sleep mode, the software renewal time may be determined so that as many of ONUs 1-3 as possible are in the sleep mode. Thereby, it is possible to minimize the adverse impact on the actual data communication between the OLT 40 and ONUs 10.

In the following, exemplary embodiments of a frame carrying the sleep request signal transmitted from each ONU 10 to the OLT 40, and of a frame carrying the sleep ack signal transmitted from the OLT 40 to each ONU 10 are explained with reference to FIGS. 9A, 9B and 9C. In addition, it should be understood that the notice of the sleep ack signal can be a response to the reception of the sleep demand signal.

FIG. 9A shows an example of a constitution of a frame in which the sleep request signal is included. FIG. 9B shows an example of a constitution of a frame in which the sleep ack signal is included. FIG. 9C shows an example of a constitution of a frame in which the software renewal time information signal is included. The frame shown in FIG. 9C can be used to inform the ONU 10 of the software renewal time period.

Figure 9B:
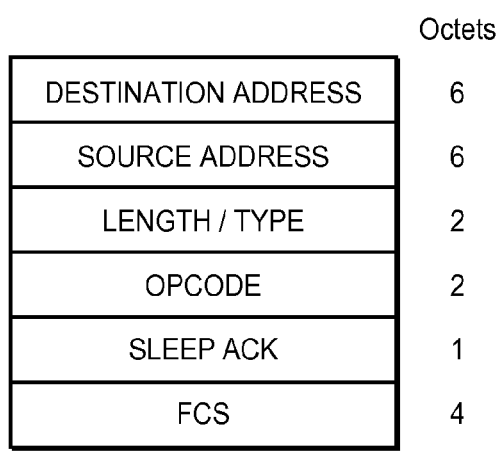
Figure 9C:
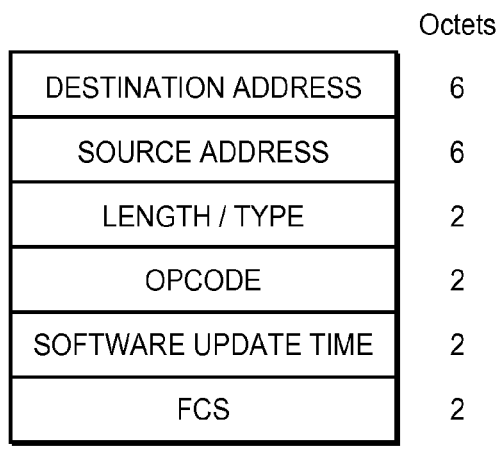

The frames shown in FIGS. 9A, 9B and 9C can have standard formats which are widely used in communication systems utilizing GE-PON technology. As shown in FIG. 9A, the frame can comprise a sleep request field for carrying a sleep request signal. The sleep request signal can be or include a signal for requesting by the OLT 40 for the ONU 10 to change from the communication mode to the sleep mode.

As shown in FIG. 9B, the frame can comprise a sleep ack field for carrying a sleep ack signal. The sleep ack signal can be or include a signal for replying to the above-mentioned sleep request signal.

As shown FIG. 9C, the frame can comprise a software renewal time field for carrying a software renewal signal. The software renewal signal can be or include a signal for notifying the ONU 10 of the software renewal time.

Other data inserted in a specific field of the frames shown in FIGS. 9A, 9B and 9C can be predetermined between the ONU 10 and the OLT 40 via communication with each other.

In a destination address field as shown in FIGS. 7, 9A, 9B and 9C, a numerical value can be inserted so as to indicate a destination of the frame. Subsequently, in a source address field, a numerical value can be inserted so as to distinguish a sender who sends the frame. That is, this field can be used to distinguish one of the ONUs 10 or the OLT 40. Additionally, an FCS field represents a field for providing the Frame Check Sequence, and is used to judge whether or not the frame has a defect (e.g. loss of data).

The remaining fields shown in FIGS. 7, 9A, 9B and 9C, (e.g. "Length/Type", "Timestamp", "Number of queue sets", "Report bitmap" and "Pad/Reserved") are regulated in IEEE802.3ah and are well-known. Consequently, the explanations of them are omitted here.

What has been described above includes examples of embodiments represented by the appended claims. It is, of course, not possible to describe every conceivable combination of components or methodologies encompassed by the claims, but it should be understood that many further combinations and permutations are possible. Accordingly, the claims are intended to embrace all such combinations, permutations, alterations, modifications and variations that fall within the spirit and scope of the claims. Moreover, the above description, and the Abstract, are not intended to be exhaustive or to limit the spirit and scope of the claims to the precise forms disclosed.

What is claimed is:

1. A power supply control method comprising the steps of:
   determining, by an Optical Network Unit (ONU), an operation time period corresponding to a communication mode that supplies electrical power to a communication circuit, and an idle time period corresponding to a sleep mode that cuts off or reduces the electrical power to the communication circuit;
   transmitting from the ONU to an Optical Line Terminal (OLT) an operation time information signal that indicates the operation time period and the idle time period;
   receiving, by the OLT, the operation time information signal;
   determining, by the OLT, a software renewal time period based on the operation time information signal;
   transmitting from the OLT to the ONU a software renewal time information signal that indicates the software renewal time period;
   receiving, by the ONU, the software renewal time information signal; and
   by the ONU, based on determining that a present time is in the operation time period or the software renewal time period, supplying the electrical power to the communication circuit during the operation time period or the software renewal time period, or based on determining that the present time is not in the operation time period or the software renewal time period, cutting off or reducing the electrical power to the communication circuit;
   wherein the step of determining at the OLT the software renewal time period further comprises the steps of:
   receiving from the ONU an operation time information signal indicating the operating time period and the idle time period;
   generating a management table based on the operation time information signal;
   storing at least one of the idle time period or the operation time period in the management table; and
   determining the software renewal time period based at least partly on at least one of the idle time period or the operation time period of the management table.

2. The power supply control method according to claim 1, further comprising:
   receiving a renewal software program from the OLT when the present time is in the software renewal time period; and
   updating the ONU with the renewal software program.

3. The power supply control method according to claim 2, wherein if data communication between the ONU and the OLT is performed during the operation time period, the step of receiving the renewal software program further comprises the steps of:
   interrupting the data communication;
   receiving at least a portion of the renewal software program from the OLT; and
   resuming the data communication after receiving the at least a portion of the renewal software program.

4. The power supply control method according to claim 2, further comprising;
   continuing to supply the electrical power to the communication circuit when completion of updating the ONU with the renewal software program is in the operation time period, or cutting off or reducing the electrical power to the communication circuit when the completion of updating the ONU with the renewal software program is in the idle time period.

5. The power supply control method according to claim 2, wherein the software renewal time period is determined so that a majority of ONUs of a network can perform updating with the renewal software program during the idle time period.

6. An optical network unit (ONU) that is operable to communicate with an optical line terminal (OLT), comprising:
   a timer unit that determines an operation time period corresponding to a communication mode that supplies electrical power to a communication circuit and an idle time period corresponding to a sleep mode that cuts off or reduces the electrical power to the communication circuit;
   a transmitting unit that transmits, to the OLT, an operation time information signal that indicates the operation time period and the idle time period;
   a receiving unit that receives a software renewal time information signal transmitted from the OLT, the software renewal time information signal indicating a software renewal time period;
   a power supply control unit that,
   based on a present time occurring in the operation time period or the software renewal time period, supplies electrical power to the communication circuit during the operation time period or the software renewal time period, or based on the present time not occurring in the operation time period or the software renewal time period, cuts off or reduces the electrical power to the communication circuit; and a software renewal unit that receives a renewal software program from the OLT when the present time occurs in the software renewal time period, and updates the optical network unit with the renewal software program;

wherein the software renewal unit updates the optical network unit with the renewal software program during a software renewal time period determined so that the optical network unit is one of a majority of optical network units of a network that are updated with the renewal software program during the idle time period.

7. The optical network unit according to claim 6, wherein based on the optical network unit receiving a software renewal time information signal during data communication between the ONU and the OLT during the operation time period, the software renewal unit interrupts the data communication, receives at least a portion of the renewal software program from the OLT, and resumes the data communication after receiving the at least a portion of the renewal software program.

8. The optical network unit according to claim 6, wherein the power supply control unit continues to supply the electrical power to the communication circuit when completion of updating the renewal software program occurs in the operation time period, or cuts off or reduces the electrical power to the communication circuit when the completion of updating the renewal software program occurs in the idle time period.

9. A communication system that communicates between at least one optical network unit (ONU) and an optical line terminal (OLT), wherein the ONU comprises:

a timer unit that determines an operating time period corresponding to a communication mode in which the ONU communicates with the OLT, and an idle time period corresponding to a sleep mode in which communication between the ONU and the OLT is suspended or reduced;

a transmitting unit that transmits, to the OLT, an operation time information signal indicating the operating time period and the idle time period;

a receiving unit that receives, from the OLT, a software renewal time information signal that indicates a software renewal time period; and a power supply control unit that, based on a present time occurring in the operation time period or the software renewal time period, supplies electrical power to the communication circuit during the operation time period or the software renewal time period, or based on the present time not occurring in the operation time period or the software renewal time period, cuts off or reduces the electrical power to the communication circuit; and wherein the OLT comprises:

a receiving unit that receives the operation time information signal;

a software renewal time period decision unit that determines the software renewal time period based on the operation time information signal transmitted from the ONU; and a transmitting unit that transmits, to the ONU, a software renewal time information signal that indicates the software renewal time period;

wherein the software renewal time period decision unit receives the operation time information signal, generates a management table indicating the operation time period and the idle time period, and determines the software renewal time period based at least partly on the operation time period and the idle time period.

10. The communication system according to claim 9, wherein the power supply control unit continues to supply the electrical power to the communication circuit when completion of updating a renewal software program occurs in the operation time period, or cuts off or reduces the electrical power to the communication circuit when the completion of updating the renewal software program occurs in the idle time period.

11. The communication system according to claim 9, wherein the software renewal time period decision unit determines the software renewal time period so that a majority of ONUs of the communication system can perform the updating of the renewal software program during the idle time period.

* * * * *